(12) United States Patent
Heimlicher (10) Patent No.: US 9,384,441 B2
(45) Date of Patent: Jul. 5, 2016

(54) TRANSPONDER FOR OBJECT IDENTIFICATION AND METHOD FOR ITS FABRICATION

(71) Applicant: Peter Heimlicher, Fribourg (CH)

(72) Inventor: Peter Heimlicher, Fribourg (CH)

(73) Assignee: OPTOSYS SA (CH)

( * ) Notice: Subject to any disclaimer, the term of this patent is extended or adjusted under 35 U.S.C. 154(b) by 44 days.

(21) Appl. No.: 14/061,159

(22) Filed: Oct. 23, 2013

(65) Prior Publication Data

US 2014/0117096 A1     May 1, 2014

(30) Foreign Application Priority Data

Oct. 29, 2012    (EP) .................................... 12190397

(51) Int. Cl.
     *G06K 19/06*      (2006.01)
     *G06K 19/077*      (2006.01)

(52) U.S. Cl.
     CPC ...... *G06K 19/07749* (2013.01); *G06K 19/0773* (2013.01); *G06K 19/07728* (2013.01)

(58) Field of Classification Search
     CPC ............ G06K 19/077; G06K 19/0772; G06K 19/07728; G06K 19/0773; G06K 19/07745; G06K 19/07749
     USPC ....................................................... 235/492
     See application file for complete search history.

(56) References Cited

U.S. PATENT DOCUMENTS

| | | | | |
|---|---|---|---|---|
| 5,428,188 A | * | 6/1995 | Dozier ............... | H01L 23/04 174/527 |
| 6,255,949 B1 | * | 7/2001 | Nicholson et al. ....... | 340/572.8 |
| 8,328,107 B2 | * | 12/2012 | Meilland et al. ........... | 235/492 |
| 2004/0099744 A1 | * | 5/2004 | Cuperus ............... | G06K 7/089 235/491 |
| 2007/0105616 A1 | * | 5/2007 | Chapet et al. ............. | 463/25 |
| 2011/0068438 A1 | * | 3/2011 | Yamazaki et al. .......... | 257/621 |

FOREIGN PATENT DOCUMENTS

| | | |
|---|---|---|
| EP | 1 884 889 A2 | 2/2008 |
| EP | 2 348 461 A1 | 7/2011 |
| WO | WO 99/19851 A1 | 4/1999 |

OTHER PUBLICATIONS

European Search Report dated Mar. 4, 2013 issued in corresponding European patent application No. EP 12 19 0397.

* cited by examiner

*Primary Examiner* — Thien M Le
*Assistant Examiner* — April Taylor
(74) *Attorney, Agent, or Firm* — Ostrolenk Faber LLP (57) ABSTRACT

The present disclosure relates to a transponder for object identification comprising at least one semiconductor component (36) for storing information and at least one antenna (11) for communicating the information with an external unit, the antenna (11) being formed by a conductor on a circuit board (7) and the semiconductor component (36) being mounted on the circuit board (7), the circuit board (7) being included in a housing (2), and it relates to a fabrication method of a generic kind. In order to improve the resistance of the transponder against harmful external influences, such as high temperatures, and to prolong its life cycle, the invention suggests that the semiconductor component (36) is included in an enclosure (18) that is hermetically sealed and fixed on a surface (12, 13) of the circuit board.

16 Claims, 5 Drawing Sheets

TRANSPONDER FOR OBJECT IDENTIFICATION AND METHOD FOR ITS FABRICATION

TECHNICAL FIELD OF THE INVENTION

The present invention relates to a transponder for object identification comprising at least one semiconductor component for storing information and at least one antenna for communicating the information with an external unit, the antenna being formed by a conductor on a circuit board and the semiconductor component being mounted on the circuit board, wherein the circuit board is included in a housing. The invention also relates to a fabrication method of such a transponder.

BACKGROUND OF THE INVENTION

Such a transponder typically operates in a radio frequency range and is often called by the acronym RFID tag. The widespread usage of RFID tags in many industries, e.g. for object tracking in production lines, warehouses, etc., makes it desirable to improve its performance and reliability with respect to its temperature resistance, contamination protection and mechanical robustness. Particularly in the field of automotive industry, RFID tags are required which can resist elevated temperatures between 200° C. and 220° C.

The latter problem has been addressed in European patent application No. EP 2 348 461 A1. To this end, a RFID tag with a housing consisting of a high temperature plastic and an overmolded top portion is disclosed. The circuit board with a semiconductor component in the form of an integrated circuit placed thereon is arranged inside the housing with a thin layer of a compressible high temperature textile on both sides. In this way, an improvement with respect to the thermal insulation and the compressibility of the circuit board inside the RFID tag shall be achieved.

The most sensitive component in such an RFID tag, however, is the integrated circuit. More specific provisions are needed to protect this weak point from detrimental external impacts such as high temperature and contamination. Moreover, the thin textile layer may only provide a comparatively weak protection of the internal electronic components against mechanical forces.

It is therefore an object of the present invention to remedy at least one of the above mentioned deficiencies and to provide a transponder of the kind mentioned in the introduction and a corresponding fabrication method so as to improve its resistance against harmful external influences, such as high temperature, and/or its long life cycle.

SUMMARY OF THE INVENTION

This object is achieved by the transponder according to claim 1 and the fabrication method according to claim 16. The dependent claims define preferred embodiments.

Accordingly, the invention proposes that the semiconductor component is included in a hermetically sealed enclosure that is fixed on a surface of the circuit board. The enclosure can provide a protection for the semiconductor component against external impacts on the transponder and can contribute to extend its life cycle. In particular, thermal degradation and/or corrosion effects at the semiconductor crystal of the semiconductor component and on the semiconductor component wiring can be advantageously reduced by the provision of such an enclosure. In a corresponding fabrication method, the semiconductor component is inserted in a hermetically sealed enclosure and the enclosure is fixed on a surface of the circuit board. In the following, the hermetically sealed enclosure containing the at least one semiconductor component is referred to as enclosure.

In the present context, the term semiconductor component in particular refers to a semiconductor device, such as a transistor or a diode, and more generally to any other component that exploits the electronic properties of a semiconductor material contained therein. In a preferred configuration, the term semiconductor component refers to an integrated circuit comprising one or more semiconductor devices.

Subsequently, various features for a further improvement of the capability of resistance and/or durability of the transponder are described which can be correspondingly applied to the transponder and to its fabrication method.

Preferably, the enclosure is under vacuum or filled with an inert gas and the enclosure is hermetically sealed to maintain an inert or vacuum atmosphere. In this way, a good protection against corrosion and external contamination can be achieved and the operational life and reliability of the transponder under exposure to high temperature and thermal cycles can be improved. Preferably, the enclosure is filled with nitrogen in order to provide the inert atmosphere. Alternatively, a vacuum atmosphere inside the enclosure can be applied.

Preferably, the enclosure comprises a lid. The lid can be used to delimit a hermetically sealed volume inside the enclosure and/or to provide an additional outer mechanical protection of the semiconductor component. More preferred, the lid is metallic or ceramic. A metallic or ceramic lid offers the advantage of an easy installation combined with a good protection and/or hermetic sealing.

Preferably, the enclosure comprises a support section with a side on which the semiconductor component is fixed and with an opposed side fixed to the circuit board. The support section preferably consists of a material that matches the thermal expansion of the circuit board, in particular the mechanical temperature coefficient of the circuit board, by a deviation of at most 50 ppm/° C., more preferred at most 10 ppm/° C. The matching of the temperature coefficient can be exploited to prevent damage to the transponder induced by thermal cycling at increased operation temperatures.

The term mechanical temperature coefficient, which may also be referred to as thermal expansion coefficient or thermal expansion linear coefficient, is to be understood as the relative change of the respective mechanical dimension when the temperature is changed by 1 K.

The match of the temperature coefficient between the support section of the enclosure and the circuit board is preferably provided at least over a range of an intended operation temperature of the transponder. The temperature range may comprise, for instance, an upper temperature value of at least 180° C., more preferred at least 250° C., and/or a lower temperature value of at most 0° C., more preferred at most −25° C. Preferably, the respective temperature coefficient is substantially constant over the intended temperature range.

Preferably, the material of the enclosure comprises exclusively inorganic materials, e.g. ceramics, metal and/or glass. A particularly preferred material to achieve the advantageous match of the thermal expansion between the support section of the enclosure and the circuit board comprises a ceramics provided on the support section of the enclosure. More preferred, at least the support section of the enclosure entirely consists of the ceramics.

Suitable materials for the circuit board comprise thermo resistant plastics, ceramics, glass and enameled metal. A preferred material of the circuit board to match the thermal expansion with the support section of the enclosure comprises a thermoresistant polyimide. More preferred, a poly-(diphenyl oxide)-pyromellitimide (or poly(4,4'-oxydiphe-nylene-pyromellitimide)) is used. This material is also known as "Kapton"® and offers the advantages of an applicability over a large temperature range, e.g. from below −200° C. up to 400° C., no inflammability and no melting point. Preferably, the circuit board also comprises a reinforcement material, preferably a glass material, to provide a more suitable thermal expansion and a higher mechanical stability.

Preferably, substantially only inorganic components are provided on the circuit board and/or inside the enclosure. More preferred, no synthetic or plastic components are provided on the circuit board and/or inside the enclosure. Most preferred, exclusively ceramic and/or semiconductor and/or metallic components are arranged on the circuit board and/or in the enclosure. Preferably, the circuit board itself only consists of thermoresistant material components. Preferably, the electric conductors connecting the components on the circuit board are at least partially attached to a surface of the circuit board and plated with a noble metal, preferably gold.

Preferably, the antenna is formed by a conductor printed on the circuit board. The use of a printed circuit board as compared to a coiled wire has the advantage that short circuits induced by a degradation of an isolator at high temperatures can be avoided. Preferably, the circuit board is impregnated before printing of the antenna to achieve a high stability and reliability at high temperatures.

Preferably, the enclosure is mounted on the opposed side of the circuit board with respect to the side of the circuit board on which the antenna is provided. Preferably, the antenna extends around an outer portion of the circuit board to maximize its effective length. Preferably, the enclosure is mounted under the antenna on the opposed side of the circuit board to reduce the connection length between the antenna and the semiconductor component included in the enclosure.

Preferably, a contact circuit for contacting the semiconductor component to the antenna is provided on the circuit board. Preferably, the enclosure is arranged on top of the contact circuit. Preferably, the contact circuit is substantially formed by a conductor printed on the circuit board.

To electrically connect the semiconductor component included in the enclosure to the circuit board, the enclosure preferably comprises at least two connection pads that are electrically connected to a conductor on the circuit board. In particular, corresponding contacts on the enclosure bottom which are in electrical contact with connection pads inside the enclosure are preferably attached to respective contacts on the circuit board.

Preferably, the electrical connection between at least one contact of the semiconductor component and a corresponding connection pad of the enclosure is established via a thermo-compression bonding. A gold wire is preferably used as a connection. Preferably, at least one connection pad comprises a gold metallization layer. These measures with respect to the electrical connection of the semiconductor component to the circuit board can further contribute to an improved high temperature resistance of the transponder and the enclosure with the semiconductor component contained therein. Further, the use of a single type of metal can reduce the effects of ion migration at the junction of the metal parts.

To further improve the mechanical stability and to facilitate the further fabrication steps, the circuit board is preferably fixed on a carrier plate. The carrier plate preferably comprises a recess for receiving the enclosure, thus providing an additional protection for the semiconductor component. Preferably, the carrier plate comprises surface structures for engaging with the circuit board to provide a first mechanical fixation. Preferably, the carrier plate comprises a liquid crystal polymer (LCP). Preferably, the carrier plate is reinforced with fibers. For instance, a composition with a content of 10% to 20%, more preferred approximately 15%, of glass fibers can lead to a good mechanical stability.

Preferably, the circuit board is overmolded by a molding compound. The molding compound can provide an encapsulation of the circuit board for a protection against temperature, contamination and mechanical impacts. Moreover, the molding compound can prevent or delay an oxidation of metallic parts, in particular metallic connections, due to the presence of gases at high temperatures. Preferably, a flexible molding compound is applied. The molding is preferably a thermoplastic compound. Preferably, the molding compound substantially consists of the same material as the carrier plate.

Preferably, the circuit board is overmolded with the molding compound after it is mechanically fixed on the carrier plate. Preferably, the molding compound extends over at least a portion of the surface of the circuit board and over at least a portion of the surface of the carrier plate. Thus, the molding compound can provide an additional fixation of the circuit board to the carrier plate. More preferred, the molding compound extends over substantially the total surface of the circuit board on one side of the circuit board.

Preferably, the molding compound extends over the side of the circuit board on which the antenna is provided. In this way, the molding compound can provide an additional fixation of the antenna to the circuit board. Such an additional fixation is particularly beneficial at high temperatures at which other fixations, such as an antenna formed by a conductor printed on the circuit board, can tend to disconnect.

Preferably, the circuit board is fully enclosed on one side by the molding compound and on the opposed side by the carrier plate. The molding compound and/or the carrier plate preferably also surrounds the lateral edges of the circuit board. More preferred, the molding compound substantially entirely surrounds the circuit board and the carrier plate. In this way, the housing in which the circuit board is included can be formed by substantially only the molding compound or the molding compound and the carrier plate.

During the overmolding process, however, strong forces are applied on the circuit board which could break off the enclosure from the circuit board. In order to avoid breakage of the enclosure, before the overmolding takes place, a protecting cap is preferably disposed on the surface of the circuit board around the enclosure. Then the protecting cap is preferably inserted into the corresponding recess of the carrier plate together with the enclosure.

Preferably, the protecting cap is placed on the circuit board in such a way that the contact circuit for contacting the semiconductor component to the antenna and the enclosure disposed on the contact circuit are fully enclosed by the protecting cap. This can provide an additional protection of the semiconductor component inside the enclosure and of the contact circuit. Thereby, the contact circuit on the circuit board may laterally protrude over the adjoining surface of the enclosure.

Preferably, the protecting cap is metallic. To provide a first mechanical fixation, the protecting cap preferably comprises fixation lobes that engage in corresponding engagement slots on the surface of the circuit board. Preferably, the inner volume of the protecting cap exceeds the volume of the enclosure contained therein. This can contribute to the prevention of thermal expansion stress of the components contained inside the protecting cap.

Preferably, a volume filler is arranged in the inner volume of the protecting cap that is not occupied by the enclosure.

The volume filler is preferably constituted by a spatially extended object. Preferably, the volume filler comprises a synthetic fluoropolymer, more preferred a polytetrafluoroethylene (PTFE), also known as "Teflon"®. In this way, the strong forces acting on the protecting cap in particular during the overmolding process can be counterbalanced by the presence of the volume filler inside and thus can prevent the protecting cap to bend.

Preferably, the housing is composed of two pieces. More preferred, the housing substantially consists of the carrier plate and the overmolding of the circuit board. Preferably, the housing is ring shaped in order to correspond to industrial demands on the shape and size of the transponder, thus allowing an easy attachment of the transponder to an associated object. Correspondingly, the circuit board and/or the carrier plate are preferably ring shaped.

BRIEF DESCRIPTION OF THE DRAWINGS

The invention is explained in more detail hereinafter by means of preferred embodiments with reference to the drawings which illustrate further properties and advantages of the invention. The figures, the description, and the claims comprise numerous features in combination that one skilled in the art may also contemplate separately and use in further appropriate combinations. In the drawings:

DESCRIPTION OF EMBODIMENTS

Figure 1:
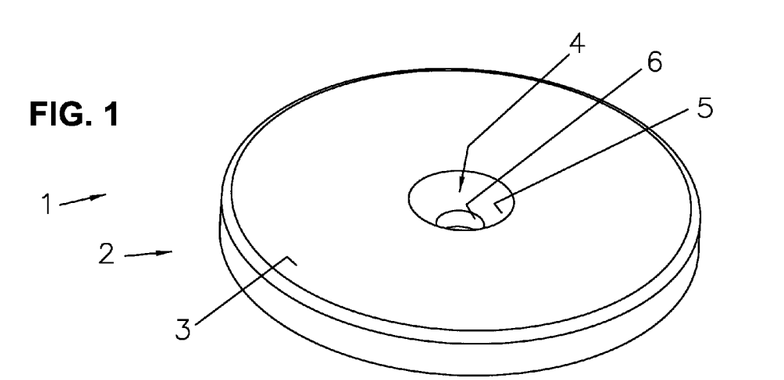
FIG. 1 is a perspective view of a transponder according to the invention.

FIG. 1 shows a transponder 1 comprising a ring shaped housing 2 with a through hole 4 in its center region. Through hole 4 comprises an upper tapering portion 5 and a lower portion 6 having a constant diameter. Through hole 4 can be used to facilitate an attachment of transponder 1 to an associated object by means of a screw or a similar fixing means. The surface material of housing 2 at an outer radial section is constituted by an overmolding of a molding compound 3. Overmolding 3 is a thermoplastic compound. The surface material of housing 2 at an inner radial section adjoining through hole 4 is constituted by a liquid crystal polymer (LCP) that is reinforced with glass fibers with a volume content of approximately 15%.

Figure 2:
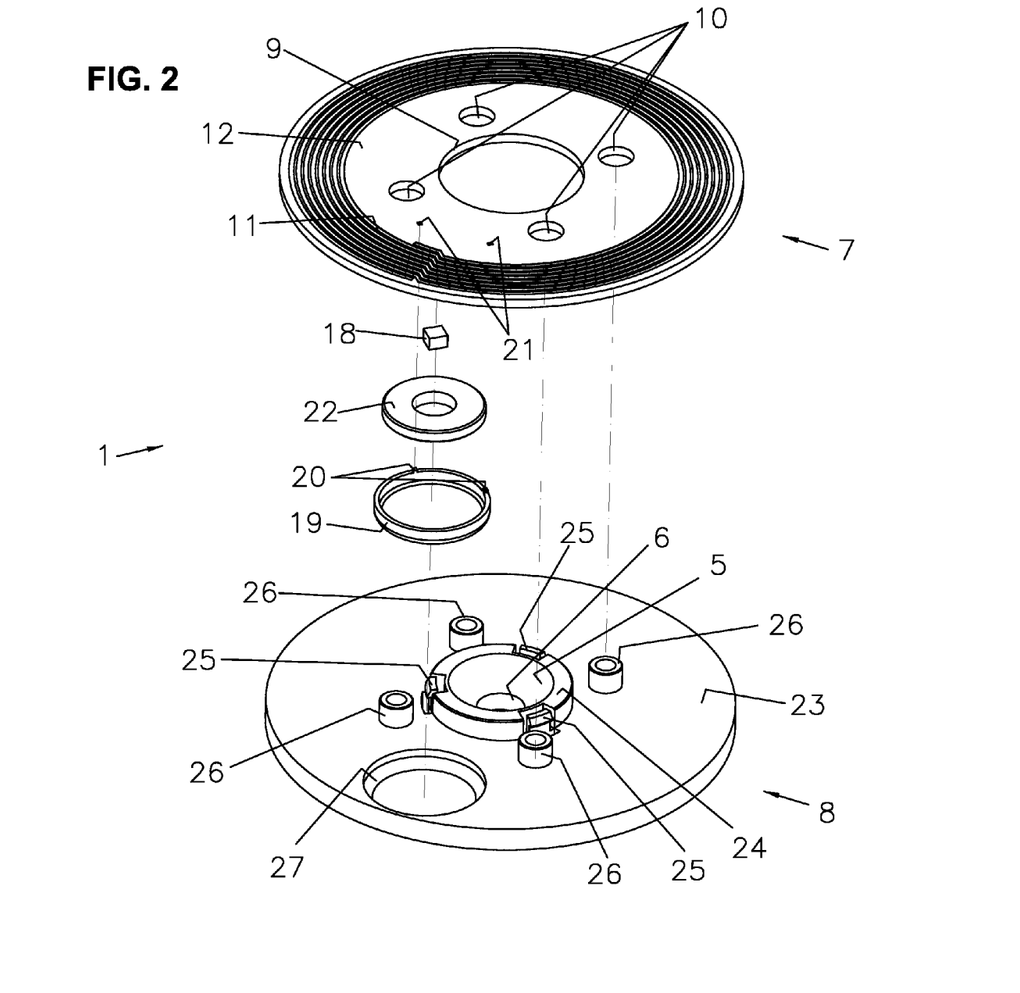
FIG. 2 is an exploded view of the transponder shown in FIG. 1 without an overmolding from an upper viewing angle.
Figure 3:
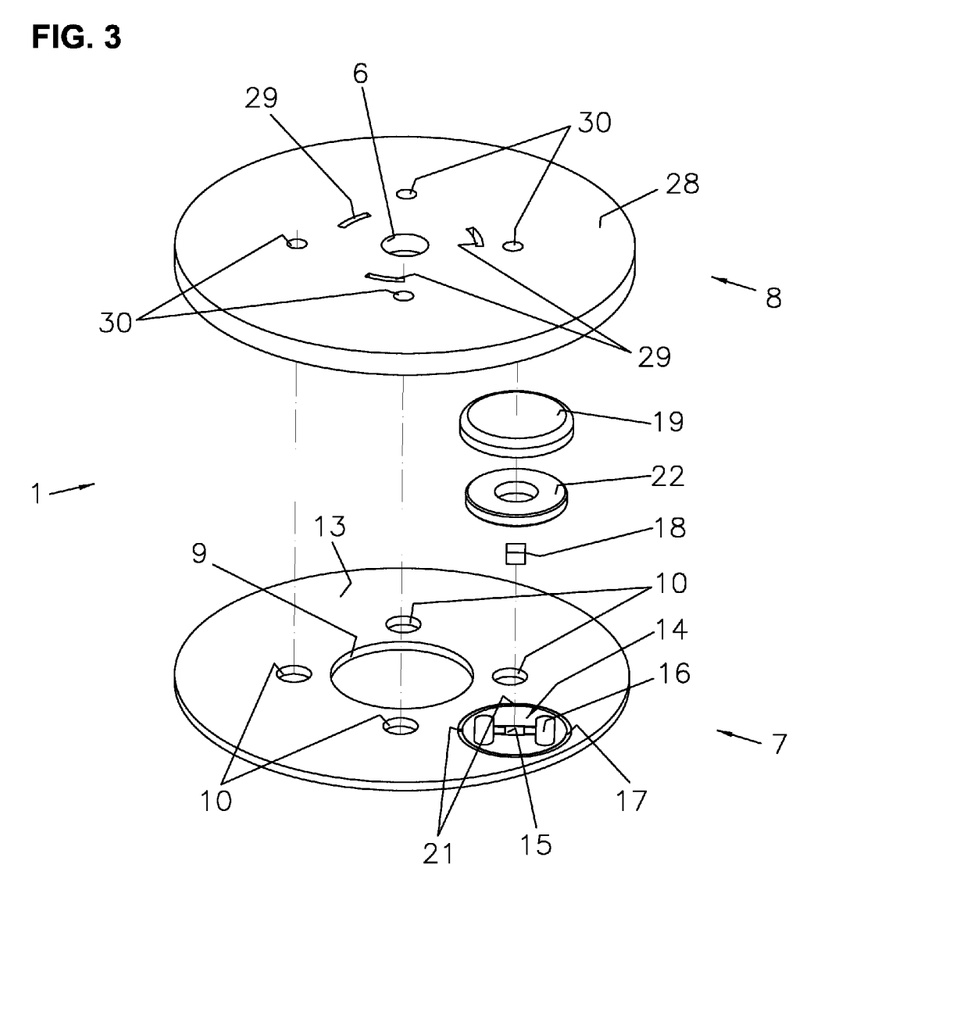
FIG. 3 is an exploded view of the transponder shown in FIG. 1 without an overmolding from a lower viewing angle.

FIG. 2 and FIG. 3 depict constituent parts of transponder 1 in an exploded view, apart from overmolding 3. Transponder 1 comprises a circuit board 7 and a carrier plate 8. Circuit board 7 is a circular plate with a central circular cut-out 9 and four smaller circular cut-outs 10 equidistantly spaced from one another and equidistantly spaced from central cut-out 8. The material of circuit board 7 is constituted by a poly-(diphenyl oxide)-pyromellitimide, also known as "Kapton"®, that is reinforced with glass fibers.

An antenna 11 is printed on the upper surface 12 of circuit board 7. Antenna 11 is a conductor stripe of homogenous width substantially extending in a spiral shaped course. Thus, antenna 11 comprises a plurality of substantially circular interconnected conductor loops, for instance five to ten conductor loops, that are neigboring each other. Antenna 11 extends over the outer radial third of upper surface 12 of circuit board 7. The conductor material is gold.

A contact circuit 14 is printed on the lower surface 13 of circuit board 7. Contact circuit 14 comprises a conductor of the same material than antenna 11. Contact circuit 14 is arranged at an outer radial portion of lower surface 13 of circuit board 7, opposite to a portion of upper surface 12 over which antenna 11 extends. Via a connection extending through circuit board 7, contact circuit 14 is electrically interconnected with antenna 11.

At its center portion, contact circuit 14 comprises a contact field 15 on which a semiconductor component can be mounted such that an electrical connection can be established between antenna 11 and the semiconductor component. Contact circuit 14 further comprises circuit elements 16 laterally protruding over contact field 15. Contact circuit 14 is surrounded by an indentation 17 on lower surface 13 of circuit board 7.

An enclosure 18 containing a semiconductor component is mounted on contact field 15. Enclosure 18 comprises contacts at its bottom which are electrically connected to a respective conductor on contact field 15. In this way, an electrical connection is established between antenna 11 and the semiconductor component inside enclosure 18 via contact circuit 14. Thereby, lateral circuit elements 16 are laterally protruding over the bottom surface of enclosure 18.

A cylindrical protecting cap 19 with a closed lid at its bottom is placed inside indentation 17. Thus, contact circuit 14 and enclosure 18 disposed on contact circuit 14 are fully enclosed inside protecting cap 19. An additional anchoring of protecting cap 19 inside indentation 17 is provided by fixation lobes 20 at the upper end of protecting cap 19 that fit snugly in corresponding engagement slots 21 inside indentation 17. An additional fixation of protecting cap 19 can be provided by soldering on top of contact circuit 14. The material of protecting cap 19 is metallic providing a robust covering of contact circuit 14 and enclosure 18.

A volume filler 22 is arranged inside protecting cap 19 substantially filling out the inner volume of protecting cap 19 that is not occupied by enclosure 18. Volume filler 22 is a ring-shaped spacer with an inner hole substantially matching the size of enclosure 18. The material of volume filler 22 is a polytetrafluoroethylene (PTFE), also known as "Teflon"®, allowing to counterbalance the forces applied on the cylindrical protecting cap during the overmolding process.

Carrier plate 8 is a circular plate with an upper surface 23 substantially corresponding to the size and shape of circuit board 7, wherein the radius of carrier plate 8 is slightly larger than the radius of circuit board 7. The thickness of carrier plate 8 exceeds the thickness of circuit board 7 by at least a factor of two. At the center region of its upper surface 23, carrier plate 8 has a ring shaped projection 24 around upper tapering portion 5 of through hole 4. The outer circumference of central projection 24 substantially matches the inner circumference of central cut-out 9 of circuit board 8.

Several snapping projections 25 are arranged around the outer circumference of central projection 24. Snapping projections 25 engage with the inner circumference of central cut-out 9 of circuit board 8 when it is placed around central projection 24. Moreover, four side projections 26 are provided on upper surface 23 of carrier plate 8. Side projections 26 are equidistantly spaced from central projection 24 and have an outer circumference substantially matching the inner circumference of circular cut-outs 10 of circuit board 7. In this way, an additional fixation of circuit board 7 on carrier plate 8 is provided.

Upper surface 23 of carrier plate 8 further comprises a circular recess 27 for receiving protecting cap 19 when circuit board 7 is mounted on carrier plate 8. Lower surface 28 of carrier plate 8 is substantially flat, except several through holes 6, 29, 30 at the respective positions of central projection 24, snapping projections 25, and side projections 26 on upper surface 23. The material of carrier plate 8 is constituted by a liquid crystal polymer (LCP) that is reinforced with glass fibers with a volume content of approximately 15%.

Figure 4:
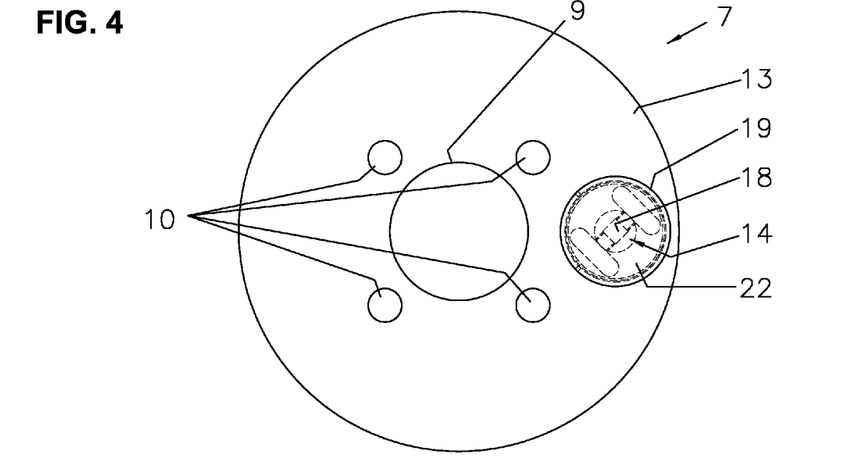
FIG. 4 is a bottom view of a circuit board of the transponder shown in FIG. 1.
Figure 5:
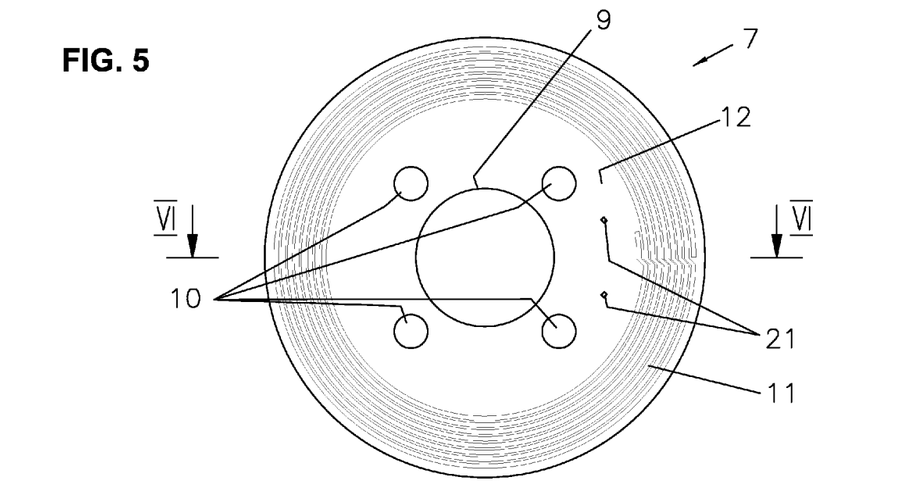
FIG. 5 is a top view of the circuit board shown in FIG. 4.
Figure 6:
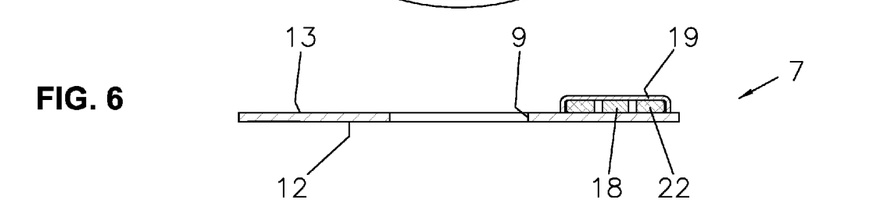
FIG. 6 is a sectional view of the circuit board shown in FIG. 5 along VI.
Figure 7:
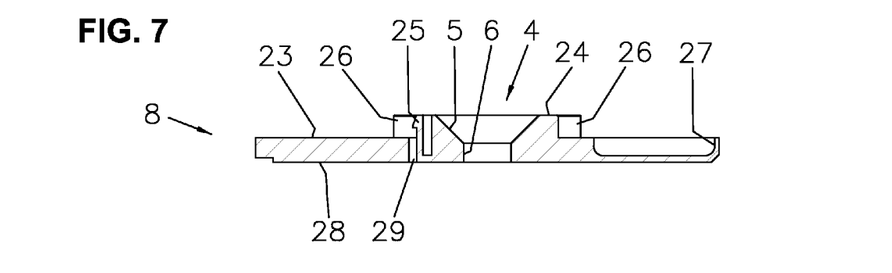
FIG. 7 is a sectional view of a carrier plate of the transponder shown in FIG. 1.

FIG. 4 shows lower surface 13 of circuit board 7 with enclosure 18 mounted on contact field 15 of contact circuit 14 and protecting cap 19 enclosing enclosure 18, volume filler 22 and contact circuit 14. FIG. 5 shows upper surface 12 of circuit board 7 with antenna 11 printed thereon. FIG. 6 shows a sectional view of circuit board 7 according to VI in FIG. 5. A corresponding sectional view of carrier plate 8 is shown in FIG. 7.

Subsequently, a method of fabricating the above described transponder 1 is specified: At first, antenna 11 and contact circuit 14 are printed on respective upper surface 12 and lower surface 13 of circuit board 13. Then, the bottom contacts of enclosure 18 are soldered to respective connection pads on contact field 15 of contact circuit 14 such that the interior semiconductor component of enclosure 18 is in electrical contact with antenna 11. By means of the soldering, enclosure 18 is fixed on lower surface 13 of circuit board 13.

In a next step, volume filler 22 is disposed around enclosure 18 on top of contact circuit 14 and protecting cap 19 is placed inside indentation 17 around contact circuit 14. An additional fixation of protecting cap 19 in this position is provided by an insertion of fixation lobes 21 inside engagement slots 20 and a soldering of protecting cap 19 to lower surface 13 of circuit board 13. In this way, circuit board 7 as shown in FIGS. 4 to 6 is obtained.

Figure 8:
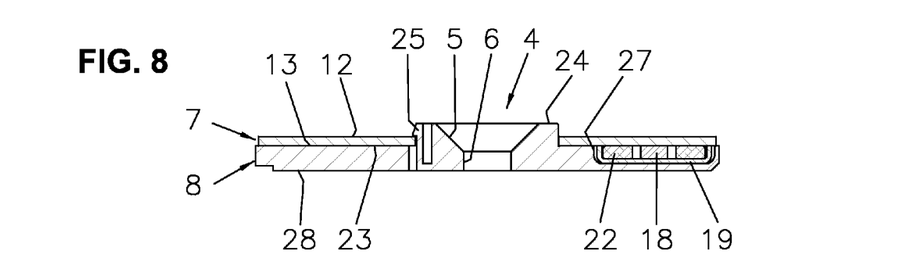
FIG. 8 is a sectional view of an assembly of the circuit board shown in FIG. 6 and the carrier plate shown in FIG. 7.

In a following step, lower surface 13 of circuit board 7 is placed on upper surface 23 of carrier plate 8, as shown in FIG. 8 in a sectional view. Central projection 24 and snapping projections 25 of carrier plate 8 are inserted into central cut-out 9 of circuit board 7 such that central projection 24 and snapping projections 25 protrude over upper surface 12 of circuit board 7. Snapping projections 25 engage at the inner circumference of circuit board 7 providing a fixation of circuit board 7 preventing a translational displacement with respect to upper surface 23 of carrier plate 8. Side projections 26 of carrier plate 8 are inserted into smaller cut-outs 10 of circuit board 7 providing a fixation of circuit board 7 preventing a rotational displacement with respect to upper surface 23 of carrier plate 8. Protecting cap 19 on lower surface 13 of circuit board 7 substantially fills out the volume of circular recess 27 at the upper surface 23 of carrier plate 8.

Figure 9:
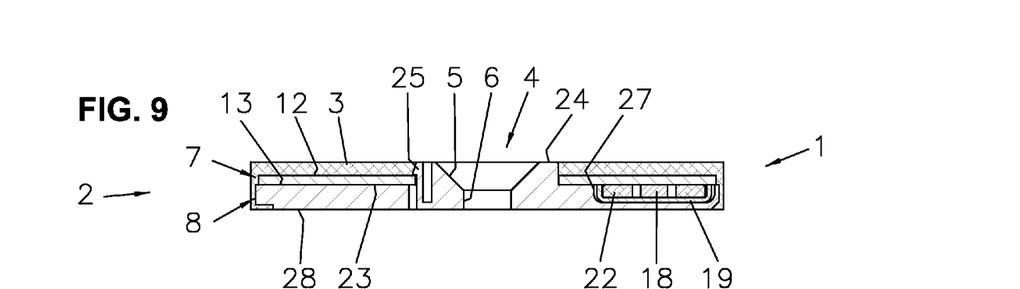
FIG. 9 is a sectional view of the transponder shown in FIG. 1.

In a subsequent step, the arrangement shown in FIG. 8 is overmolded with molding compound 3, as shown in FIG. 9 in a sectional view. Overmolding 3 extends from protruding central projection 24 and snapping projections 25 over upper surface 12 of circuit board 7 over the lateral edges of circuit board 7 and carrier plate 8 to an outer radial section of lower surface 28 of carrier plate 8. In this way, carrier plate 8 is fully enclosed by means of carrier plate 8 and overmolding 3, which are constituting housing 2 of circuit board 7. Overmolding 3 can also be applied to entirely surround carrier plate 8 and circuit board 7.

Overmolding 3 provides a protection of upper surface 12 of circuit board 7. Thus, antenna 11 printed on upper surface 12 is securely fixed in its position due to the direct application of overmolding 3 on the top, in particular in the case of a detachment of the conductor printing due to high temperature influences. The more sensitive components comprising the semiconductor component inside enclosure 18 are even more protected against external influences of temperature, contamination and mechanical impacts due to their arrangement inside protecting cap 19. This protection is further enhanced since protecting cap 19 is positioned in between carrier plate 8 and circuit board 7 with overmolding 3 on top and contains volume filler 22 for an additional protection. Already during the overmolding procedure, protecting cap 19 serves as a protection for the components contained therein when the high pressure impacts typically occurring during the overmolding represent a risk of tearing out enclosure 18 from its soldering.

Figure 10:
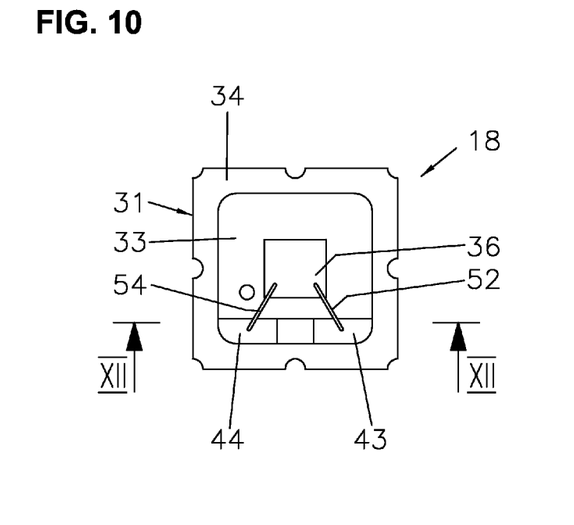
FIG. 10 is a top view of an enclosure for a semiconductor component without a lid.
Figure 11:
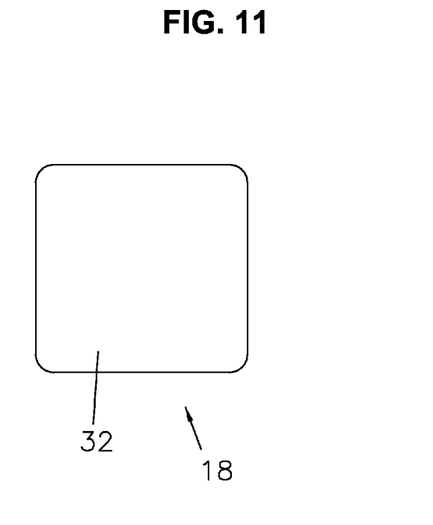
FIG. 11 is a top view of the enclosure shown in FIG. 10 comprising a lid.

FIG. 10 depicts enclosure 18, wherein a lid 32 on top of enclosure 18 (as shown in FIG. 11) is removed, in order to illustrate the internal configuration of enclosure 18. Enclosure 18 comprises a ceramic body 31. A base of ceramic body 31 is formed by a flat support section 33. Outer side walls 34 vertically delimit an inner volume 35 inside enclosure 18. Ceramic body 31 has a substantially quadratic cross-section.

Support section 33 is used as a support of a semiconductor device 36, more particularly an integrated circuit (IC). Integrated circuit 36 is fixed on the upper surface of support section 33. A first connection pad 43 and a second connection pad 44 are arranged on support section 33 in close proximity to integrated circuit 36. Connection pads 43, 44 comprise a gold metallization layer. Via respective gold wires 52, 54, integrated circuit 36 is connected to connection pads 43, 44.

FIG. 11 depicts enclosure 18, wherein lid 32 is attached on top of enclosure 18. Lid 32 is metallic and is applied on enclosure 18 after the internal wiring of integrated circuit 36 has been carried out. The metallic composition of lid 32 is suitable for an easy installation and can offer a good mechanical protection and a tight sealing of the inner volume 35 of enclosure 18.

Figure 12:
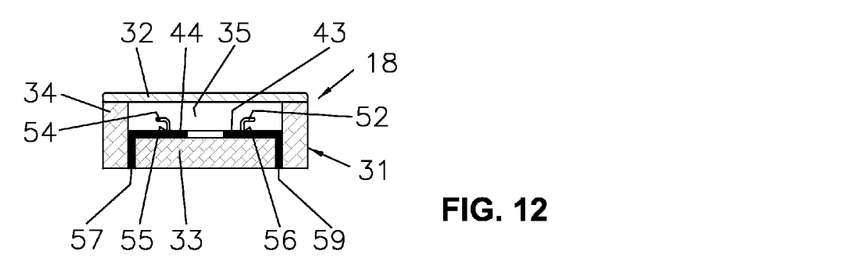
FIG. 12 is a sectional view of the enclosure shown in FIGS. 10 and 11 along XII.

FIG. 12 shows a cross-sectional view of enclosure 18 shown in FIG. 11 at the position of the attachment of gold wires 52, 54 on connection pads 43, 44 shown in FIG. 11. Gold wires 53, 54 are attached to the gold metallization layer of connection pads 43, 44 via a thermocompression bonding 55, 56. In this way, the resistance against heating induced degradation and corrosion is further improved.

Connection pads 43, 44 are electrically connected to respective bottom contacts 57, 59 on the lower surface of support section 31. Enclosure 18 is fixed on contact field 15 of contact circuit 14 printed on circuit board 7. Thereby, bottom contacts 57, 59 are attached to respective contacts on contact field 15 by a high temperature solder. In this way, a good corrosion and heating resistant fixation of enclosure 18 on circuit board 7 is provided. The protection of integrated circuit 36 on circuit board 7, in particular during high temperature operation of transponder 1, is further improved after the application of volume filler 22 and protecting cap 19 around contact circuit 14.

After fixation of enclosure 18 on circuit board 7, substantially only support section 34 of enclosure 18 is in direct contact with lower surface 13 of circuit board 7. Thus, the thermal expansion between enclosure 18 and circuit board 7 can be advantageously matched due to the advantageous material selection of circuit board 7 and enclosure 18.

Inner space 35 of enclosure 18 is filled with nitrogen. Due to the tight sealing provided in between ceramic body 31 and metallic lid 32, the inert atmosphere inside inner space 35 can be maintained over a comparatively long time period. The inert atmosphere 35 leads to a further improvement of the avoidance of corrosion, contamination and thermoinduced degradation effects and contributes to a long lifetime of transponder 1.

From the foregoing description, numerous modifications of the transponder according to the invention are apparent to one skilled in the art without leaving the scope of protection of the invention that is solely defined by the claims.

The invention claimed is:

1. A transponder for object identification comprising at least one semiconductor component for storing information and at least one antenna for communicating the information with an external unit, the antenna being formed by a conductor on a circuit board and the semiconductor component being mounted on the circuit board, the circuit board being included in a housing, wherein the semiconductor component is included in an enclosure that is hermetically sealed and fixed on a surface of the circuit board;
   wherein the enclosure comprises a support section with a side on which the semiconductor component is fixed and with an opposed side fixed to the circuit board.

2. The transponder according to claim 1, wherein the enclosure is under vacuum or filled with an inert gas and the enclosure is hermetically sealed to maintain an inert atmosphere.

3. The transponder according to claim 1, wherein the enclosure substantially consists of one or more inorganic materials.

4. The transponder according to claim 1, wherein the circuit board comprises a thermoresistant polyimide.

5. The transponder according to claim 4, wherein the thermoresistant polyimide is-a poly-(diphenyl oxide)-pyromellitimide.

6. The transponder according to claim 1, wherein the circuit board is fixed on a carrier plate, the carrier plate comprising a recess for receiving the enclosure.

7. The transponder according to claim 6, wherein the carrier plate substantially consists of at least one inorganic material.

8. The transponder according to claim 7, wherein the inorganic material is a liquid crystal polymer.

9. The transponder according to claim 6, wherein the circuit board is overmolded by a molding compound.

10. The transponder according to claim 9, wherein the housing is constituted by the molding compound and/or the carrier plate.

11. The transponder according to claim 1, wherein the semiconductor component is an integrated circuit.

12. The transponder according to claim 1, the support section consisting of a material that matches the temperature coefficient of the circuit board by less than 50 ppm/° C.

13. The transponder according to claim 12, the support section consisting of a material that matches the temperature coefficient of the circuit board by less than 10 ppm/° C.

14. A transponder for object identification comprising at least one semiconductor component for storing information and at least one antenna for communicating the information with an external unit, the antenna being formed by a conductor on a circuit board and the semiconductor component being mounted on the circuit board, the circuit board being included in a housing, wherein the semiconductor component is included in an enclosure that is hermetically sealed and fixed on a surface of the circuit board;
   wherein the enclosure is mounted on the opposed side of the circuit board with respect to the side of the circuit board on which the antenna is provided.

15. A transponder for object identification comprising at least one semiconductor component for storing information and at least one antenna for communicating the information with an external unit, the antenna being formed by a conductor on a circuit board and the semiconductor component being mounted on the circuit board, the circuit board being included in a housing, wherein the semiconductor component is included in an enclosure that is hermetically sealed and fixed on a surface of the circuit board;
   wherein a protecting cap is arranged on the surface of the circuit board around the enclosure; and
   wherein a volume filler is arranged in an inner volume of the protecting cap.

16. The transponder according to claim 15, wherein a contact circuit for contacting the semiconductor component to the antenna is provided on the circuit board, the enclosure being arranged on top of the contact circuit, wherein the contact circuit laterally protrudes over the adjoining surface of the enclosure and the contact circuit is enclosed in the protecting cap.

\* \* \* \* \*